Figure 1:
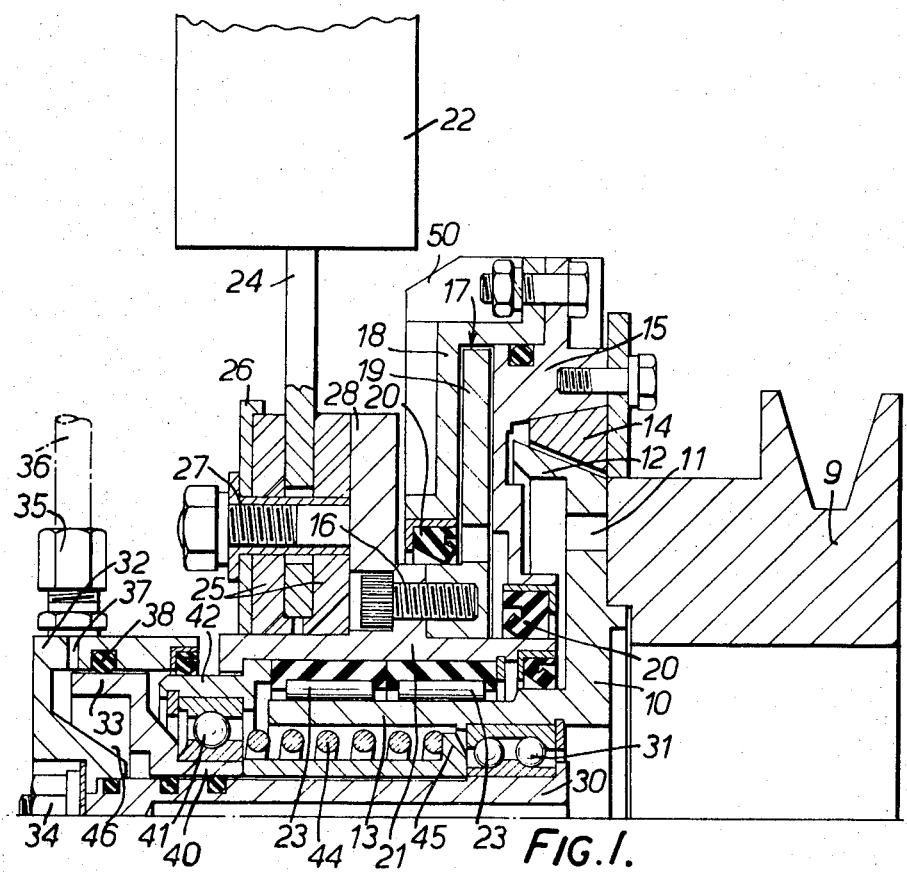

United States Patent [19]

Elmer

[11] 3,757,914
[45] Sept. 11, 1973

[54] FAN DRIVES
[75] Inventor: Arthur Ernest Henry Elmer, Painswick, Great Britain
[73] Assignee: Dynair Limited, Nailsworth, Great Britain
[22] Filed: Nov. 19, 1971
[21] Appl. No.: 200,454

[30] Foreign Application Priority Data
Nov. 21, 1970 Great Britain.................. 55,490/70

[52] U.S. Cl............. 192/48.3, 192/58 B, 192/91 A, 192/82 T
[51] Int. Cl............................................ F16d 47/06
[58] Field of Search................. 192/55, 58 A, 58 B, 192/58 C, 48.3, 82 T, 91 A

[56] References Cited
UNITED STATES PATENTS
3,120,219  2/1964  Nallinger........................... 192/82 T
1,767,566  6/1930  Updike.............................. 192/55 X
3,145,816  8/1964  Lorean et al. .................... 192/91 A
1,667,565  4/1928  Radcliffe........................... 192/58 A
2,637,308  5/1953  Dodge............................... 192/82 T
3,280,948  10/1966  Carriere............................ 192/48.3

Primary Examiner—Allan D. Herrmann
Attorney—Irvin S. Thompson et al.

[57] ABSTRACT

A rotary fan including a fluid filled slipping clutch and means for dis-engaging the slipping clutch by means of a remote thermal sensing device in a liquid coolant circuit. In one form of the invention the thermal sensor controls a pneumatic ram connected to a friction clutch in series with the slipping clutch. In another form of the invention the thermal sensor actuates a pneumatic ram in the fan hub which controls a device for evacuating fluid from the slipping clutch to disconnect the drive.

5 Claims, 5 Drawing Figures

Patented Sept. 11, 1973

3,757,914

2 Sheets-Sheet 1

Patented Sept. 11, 1973

3,757,914

2 Sheets-Sheet 2

FAN DRIVES

This invention relates to rotary drive units or assemblies for connecting a rotary input member to an output member such as a cooling fan. The invention may be applied to rotary shaft drives but is particularly applicable to an actual cooling fan drive assembly as used for example on a motor vehicle or other internal combustion engine.

It is well known that the cooling requirements of any engine on a motor vehicle vary very considerably, and depend amongst other things on the load, gradient, and speed of the vehicle, and the ambient temperature and wind velocity. Considerable power will frequently be wasted in driving the cooling fan at excessive speed, or when the fan is not required at all, for example when the relative wind speed creates adequate ram effect for cooling purposes. A fan driven at high speed also creates considerable noise and also tends to cause wear in fan belts or other drive systems and associated parts such as water pumps.

Many previous attempts have been made to provide some control of the drive to a fan but most existing systems are expensive or somewhat ineffective for one reason or another. It is an object of the present invention in particular to provide a fan drive which will allow the fan to be driven when required at a speed somewhat slower than that of the input drive member, but without incurring the difficulties expected from a normal type of slipping clutch.

Broadly from one aspect the invention consists in a cooling fan drive assembly, comprising a hub for the fan, connected to a rotary drive member through a viscous slipping clutch arranged in series with a thermally controlled positive clutch for interrupting the drive.

The term "positive clutch" as used above is intended to mean a clutch capable of being engaged to provide a positive drive, or disengaged to interrupt the drive. A particularly convenient form of positive clutch is a friction clutch: alternatively an electrically controlled magnetic clutch may be used.

According to a preferred feature of the invention the assembly includes a resilient torsional vibration damper in the torsional drive path from the drive member to the fan hub. The torsional vibration damper may be on the input side of the slipping clutch, but is preferably situated between the slipping clutch and the fan blades, and according to another preferred feature of the invention the assembly includes remote control means for controlling the engagement of the friction clutch in response to changes in temperature of a coolant for the engine on which the fan assembly is to be mounted. For example the apparatus may include a thermally controlled pneumatic ram mounted on or within the assembly for actuating the friction clutch.

Furthermore the assembly also preferably includes resilient means tending to urge the friction clutch into an engaged condition, and preferably the friction clutch is controlled by means of a pneumatic pressure line connected to the assembly at the end thereof remote from the drive member.

Thus the invention provides a simple and entirely automatic system with a combination of features and advantages hitherto unobtainable. The viscous slipping clutch allows the speed of the fan to vary below that of the rotary drive member at higher engine speeds and by appropriate design the maximum fan speed can be predetermined and set at a value which prevents excessive noise and wear. By combining the viscous slipping clutch in series with a thermally controlled friction clutch the drive can be totally disconnected when the sensed temperature is above a preselected minimum value, thus substantially eliminating the wasteful power absorption and heating effect in the slipping clutch for long periods during operation. With both clutches engaged the torsional vibrations from the crank-shaft or other drive member are effectively damped by the resilient damping device, and the thermal control includes a remote thermal senser which can be associated with the water cooling system or other coolant for the engine thus avoiding many of the difficulties experienced in any system having an air sensing thermal device such as a bi-metallic strip exposed directly to the air passing over the engine. Such elements tend to become extremely dirty, inherently have a tendency for thermal drift, and some sluggishness in response, and moreover any temperature sensing from cooling air is less reliable than a liquid coolant thermal sensing system since it is affected considerably by ambient temperature variations.

From another aspect the invention also consists in a cooling fan drive assembly comprising a hub for the fan and a viscous slipping clutch connected to drive the hub from a rotary drive member, a reservoir for fluid, adjustment means controlling or influencing the displacement of fluid between the reservoir and the slipping clutch to vary the torsional drive, and remote control means for actuating the adjustment means, for example in response to temperature changes at a position displaced from the fan.

In such a system the remote control means preferably comprises a pneumatic ram forming part of the fan drive assembly, and means for connection to a non-rotating pneumatic control line.

An assembly according to this latter aspect of the invention has many of the same features and advantages mentioned above. By controlling the quantity of fluid effectively present in the slipping clutch the drive can be varied and by effectively evacuating the clutch the drive can be disconnected when the sensed temperature so indicates, the temperature sensing being performed by and through the remote control system from a sensing point located for example in the water cooling circuit. This assembly may also include a resilient torsional vibration damper acting between the fan itself and the rotary drive member to provide or minimise transmission of high frequency vibrations to the fan.

Figure 2:
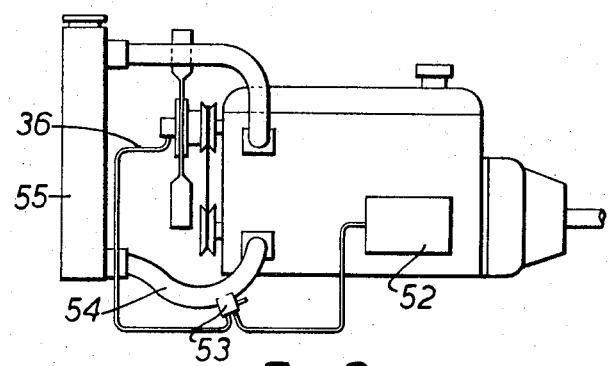
Figure 3:
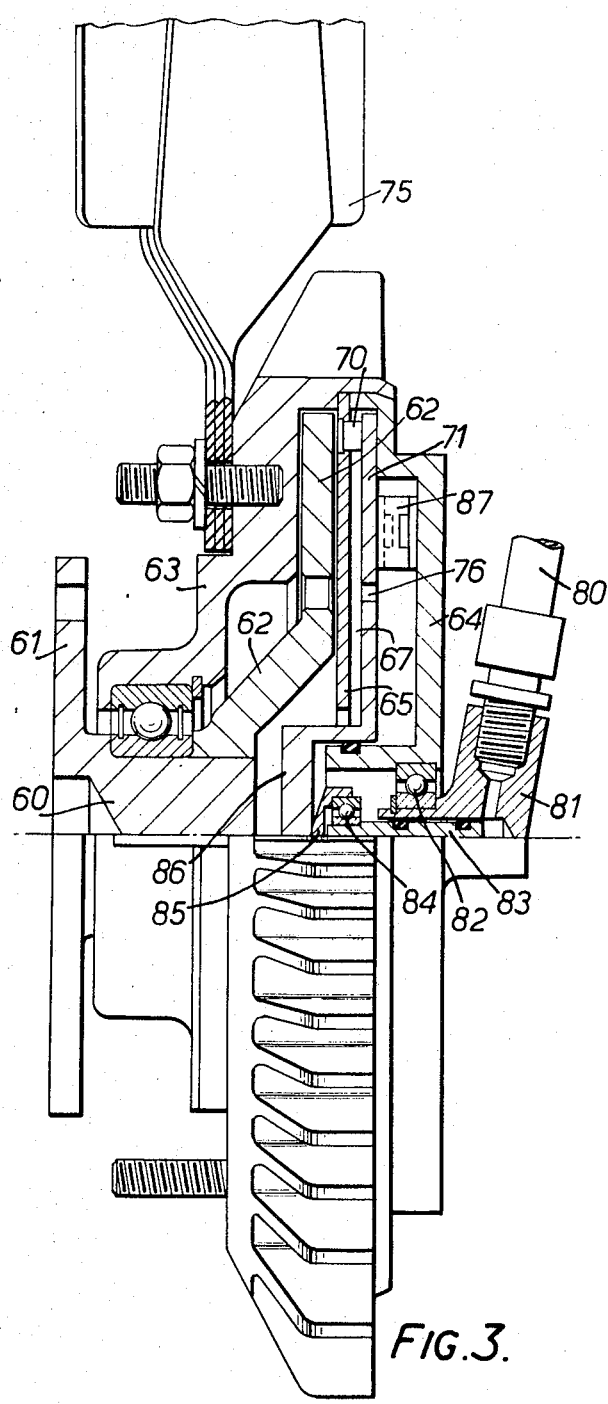
Figure 4:
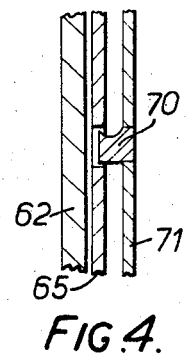
Figure 5:
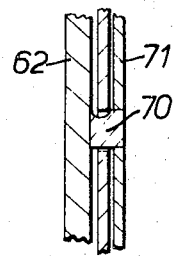

The invention may be performed in various ways and two specific embodiments will now to described by way of example with reference to the accompanying drawings, in which:

FIG. 1 is a sectional side elevation through one half of a first example of a fan drive assembly according to the invention, FIG. 2 is a diagram illustrating the main components of a remote coolant temperature sensing control system, FIG. 3 is a somewhat diagrammatic part-sectional elevation through a second embodiment, and FIGS. 4 and 5 are detailed sectional developed views illustrating the two operative positions of the fluid scoops incorporated in the embodiment of FIG. 3.

In the first example the fan drive unit comprises a rotary drive member 10 having bolt holes 11 by which it may be bolted to a drive pulley 9, or some other drive shaft such as a crank shaft of the engine. The member 10 is also connected to a flange 12 which forms the input element of a friction clutch and to a projecting sleeve element 13 which provides a bearing support for the rotary fan hub. The friction clutch input element 12 is surrounded by a friction ring 14 of trapezoidal cross-section, this being surrounded in turn by a friction clutch output element 15 attached to the outer housing 18 of a viscous fluid slipping clutch. The housing 18 forms a narrow annular chamber in which is located a clutch disc 19 having a very small clearance around its periphery 17 and on each face, the enclosed chamber being sealed by a pair of rotary seals 20, and occupied by a viscous fluid such as a silicone fluid. The disc 19 is attached by bolts 16 to a sleeve 21 which provides a hub on which the fan blades 22 are mounted. This sleeve 21 is supported by roller bearings 23 from the sleeve 13 of the input drive member. The fan blades 22 are attached to a ring 24 which is sandwiched between a pair of rubber discs 25, and connected by means of a pressure plate 26 and tension bolts 27 to a flange 28 formed integral with the sleeve 21. It will be seen that the system so far described provides a torsional drive including in series the friction clutch 12, 14, 15, the viscous slipping clutch 18, 19, and the torsional vibration damper constituted by the rubber mounting 25.

The viscous slipping clutch is permanently filled and sealed and has no external control: it automatically drives with increasing slip as the load and speed increase, and may be designed to set a predetermined maximum output speed of the fan blades. The friction clutch however is controlled by a pneumatic ram assembly built into the fan drive unit and arranged to cause bodily axial movement of the sleeve 21 relative to the input drive member 10. Basically this pneumatic ram system comprises a central stem 30 connected at its right hand, inner, end to the sleeve 13 by means of a thrust bearing 31 and attached at its left hand, outer, end by means of a nut 34 to a hollow annular casing or cylinder 32 which houses a movable piston 33. The cylinder 32 is provided with a radial coupling 35 for connection to a flexible compressed air supply line 36 (see FIG. 2) by which compressed air is admitted to or exhausted from the cylinder through a radial drilling 37, the cylinder 32 and stem 30 being fixed axially by means of the bearing 31 and held against rotation by the line 36. An O-ring seal 38 within the cylinder wall engages the external surface of the piston. The piston is formed integral with a short sleeve 40 loosely surrounding the stem 30, and the sleeve 40 is connected by a thrust bearing 41 to a ring 42 which is secured to the blade mounting sleeve 21, so that axial movements of the piston are imparted to the sleeve 21 and vice versa. A spacer sleeve 43 is interposed between the sleeve 40 and the inner race of the thrust bearing 31, and a helical compression spring 44 is positioned between the inner race of the bearing 41 and an abutment flange 45 at the right hand end of the spacer sleeve.

When air pressure is admitted through the pressure line 36 and coupling 35 the air passes into a chamber 46 on the left side of the piston 33, and since the cylinder 32 is prevented from moving axially by the thrust bearing 31 the air pressure in the ram chamber 46 causes the annular piston 33 to be displaced to the right in FIG. 1, carrying with it the sleeve 21 and hence the housing 18 and the friction clutch output element 15. This disengages the friction clutch and the drive to the fan is thus completely disconnected. The clutch is re-engaged by the spring 44 and it will be noted that this provides a "fail safe" feature since any failure of the air supply will automatically cause the friction clutch to be re-engaged.

Also it will be noted that both the ram cylinder 32 and the ram piston 33 are non-rotary, so that only minimal friction occurs at the O-ring seal 38, regardless of whether the friction clutch is engaged or disengaged. Furthermore since the clutch engaging spring 44 is positioned between the inner races of the two thrust bearings 31, 41, and due to the presence of the spacer sleeve 43 between these two races, the force of the spring is not transmitted through these bearings when the piston 33 is moved to the right to disengage the friction clutch, so that the bearings are protected from load during a large part of the life of the unit.

The casing 18 of the viscous slipping clutch is subject to some temperature rise due to the inevitable heating of the viscous fluid, and the casing is provided with a large number of external cooling fins 50 exposed to the flow of cooling air passing over the fan. The rubber mounting rings 25 for the fan blades are however separated from this hot casing 18 and are only indirectly connected to the internal disc 19, so that they are effectively protected from any substantial heating effects.

As illustrated diagrammatically in FIG. 2 the pneumatic supply line 36 is a stationary non-rotating flexible tube which is connected to a supply of compressed air (or vacuum) 52 on the vehicle, via a valve 53 mounted on and controlled by a wax capsule temperature sensing element fitted into the water cooling circuit of the vehicle, preferably at the lower hose connection 54 to the radiator 55. One form of valve unit designed for this purpose is illustrated in U.S. Pat. No. 3,446,430.

A number of advantages are obtained by the arrangements described. The maximum power absorption, speed, and noise of the fan are limited by the slipping viscous clutch 18, 19. The slipping clutch drive is however over-ridden by the pneumatic thermal control 53 sensitive to the coolant temperature rather than the air temperature. The slipping clutch is thus fully disconnected when the coolant temperature is above a predetermined value. The torsional vibrations from the input drive member 9 are absorbed by the resilient rubber damper 25 and are not transferred to the fan blades so that the unit can, if required, be mounted direct on the crankshaft, and this is achieved without subjecting the rubber mounting to the heat of the viscous clutch. If the pneumatic control system should fail the friction clutch will re-engage thus providing a continuous drive through the viscous clutch. Also the thermal drift and thermal delay experienced in any direct air sensing unit are almost entirely eliminated.

In the second example of the invention the unit does not incorporate a friction clutch but has a coolant temperature sensing control system for varying the effective quantity of liquid in the viscous slipping clutch. As shown in FIG. 3 the unit comprises a main input drive member 60 having a flange 61 formed with holes to receive bolts for connection to a crankshaft or cam shaft of the engine, the drive member 60 being connected to an annular drive disc 62 forming the input element of a viscous fluid clutch. The disc is surrounded by a housing comprising a back casting 63 a front plate 64 and an intermediate partition plate 65. The casting 63 and the partition plate 65 are formed to give a small clearance on both faces of the disc 62 and the space between the plates 64 and 65 acts as an internal compartment 67 which provides a fluid reservoir.

The partition plate 65 has a number of small apertures around its periphery, and in each of these is mounted an axially movable scoop 70, the scoops being mounted on a control plate 71. When the plate 71 is in the right hand position illustrated in FIG. 4 the scoops are withdrawn into the apertures in the partition plate, and are ineffective: fluid then occupies the clearance spaces on both sides of the drive disc 62, and torque is transmitted to the output part of the clutch including the back casting 63 on which the fan blades 75 are mounted. When the plate 71 is in its left hand position illustrated in FIG. 5 the scoops are extended through the apertures in the partition plate into close proximity with the drive disc 62, and the relative rotation between the disc and the scoops causes fluid to be impelled radially inwards into the reservoir compartment 67, passing through apertures 76 in the control plate to occupy the volumes on both sides of this plate 71. The quantity of fluid in the small clearance volumes on opposite sides of the drive disc 62 is thus reduced, so reducing the torque capacity of the unit.

The movements of the control plate 71, which govern the operation of this viscous drive clutch, are controlled by a remotely situated thermal sensing device similar to the thermal sensing valve 53 of FIG. 2, arranged to admit compressed air via a flexible pressure line 80 connected to a non-rotary ram cylinder member 81 positioned within a central recess in the front plate 64, and axially fixed relative thereto by a thrust bearing 82. A movable plunger piston 83 within the ram cylinder has a pair of O-ring seals engaging the cylinder wall, and the left hand end of this plunger is connected through a thrust bearing 84 to a cap 85 which bears on the central part 86 of the control plate. A series of tangential springs 87 are positioned around the periphery of the control plate, and attached to this plate and to the front plate 64, the springs acting to draw the plate 71 towards the front plate 64, i.e., in a direction to withdraw the scoops 70 so that the operative clearance spaces of the clutch are allowed to fill with fluid.

In operation, when the temperature of the engine coolant is below the predetermined value the thermal sensing valve is arranged to connect the pressure line 80 to relief. The springs 87 act to move the plate 71 to the right, the scoops 70 are withdrawn, fluid occupies the clearance spaces on both sides of the drive disc 62, and the viscous drive unit is allowed to operate in the normal manner, providing a torsional drive with increased slip as the speed and torsional resistance of the fan blades increase. When the temperature of the engine coolant reaches the preselected value the thermal sensing valve connects the pressure line 80 to a source of compressed air (as in FIG. 2) which enters the right hand end of the ram cylinder and forces the plunger piston 83 to the left, thus shifting the control plate 71 in the same direction, and so causing the scoops to extend into close proximity with the drive disc 62. As explained this results in fluid being withdrawn from the clearance spaces into the reservoir compartment 67 so that the viscous clutch is rendered partially or wholly inoperative, and the drive to the fan is interrupted. When the coolant temperature falls the process is reversed, the scoops are withdrawn by the springs 87, and the viscous drive is again rendered operative.

To prevent or reduce transmission of torsional vibrations a rubber damping unit (not shown) may be incorporated in the drive and conveniently positioned between the housing and the fan blade ring, in a similar manner to that illustrated in FIG. 1.

I claim:

1. A cooling fan assembly including a rotary input drive member located at one axial end of the assembly and formed with means for attachment to a drive shaft or pulley, a friction clutch including a clutch input element secured to said input drive member, and a clutch output element, a viscous fluid clutch arranged torsionally in "series" with said friction clutch and including a rotary clutch casing secured to said friction clutch output element, and a rotary clutch driven member located within said casing and spaced by a small clearance from the internal wall surfaces of said casing, and sealing means acting between said clutch casing and said clutch driven member providing an enclosed sealed fluid chamber, a hub having means for attaching a plurality of fan blades thereto and secured to said rotary clutch driven member, bearing means acting between said hub and said input drive member and supporting said hub for rotation and axial movement relative to said input drive member, a fluid operated ram including two axially movable operative ram elements, namely a ram cylinder and a ram piston, one of said ram elements being connected to said hub and the other ram element being connected to said input drive member, whereby relative axial displacement of said ram elements causes relative axial displacement of said hub relative to said input drive member, and consequent relative axial displacement between said friction clutch input and output elements, spring means acting in an axial direction between said friction clutch input and output elements in a direction to cause engagement of said friction clutch, and a non-rotary pressure fluid supply conduit located at the end of said hub remote from said rotary input drive member, and communicating with said ram cylinder.

2. A cooling fan assembly according to claim 1, wherein said rotary clutch casing has external cooling fins, and including a resilient torsional vibration damper element mounted on said hub and interposed between said hub and said fan blade mounting means.

3. A cooling fan assembly according to claim 1, wherein said pressure fluid supply conduit is flexible and is connected to a remote thermally actuated pressure control valve.

4. A cooling fan ssembly according to claim 1, wherein said two operative ram elements are both non-rotary and including thrust bearings acting respectively between one of said ram elements and said fan hub, and between the other of said ram elements and said rotary input drive member.

5. A cooling fan assembly according to claim 1, wherein said rotary input drive member is secured to a rotary drive shaft or pulley, which constitutes the sole support for said assembly.

* * * * *